United States Patent
Hasegawa

(10) Patent No.: US 9,969,020 B2
(45) Date of Patent: May 15, 2018

(54) WIRE ELECTRIC DISCHARGE MACHINE HAVING FUNCTION OF MOVING FROM ARBITRARY RETREAT POSITION IN ELECTRIC DISCHARGE STATE AND RETURNING TO HALT POSITION

(71) Applicant: FANUC Corporation, Yamanashi (JP)

(72) Inventor: Yasuo Hasegawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 263 days.

(21) Appl. No.: 14/822,149

(22) Filed: Aug. 10, 2015

(65) Prior Publication Data

US 2016/0039029 A1  Feb. 11, 2016

(30) Foreign Application Priority Data

Aug. 11, 2014 (JP) .................. 2014-163926

(51) Int. Cl.
| | | |
|---|---|---|
| B23H 7/16 | (2006.01) | |
| B23H 7/04 | (2006.01) | |
| B23H 7/06 | (2006.01) | |
| B23H 7/20 | (2006.01) | |
| B23H 1/02 | (2006.01) | |

(52) U.S. Cl.
CPC .......... B23H 7/16 (2013.01); B23H 7/04 (2013.01); B23H 1/02 (2013.01); B23H 2500/20 (2013.01); G05B 2219/45043 (2013.01)

(58) Field of Classification Search
CPC . B23H 1/02; B23H 1/024; B23H 7/06; B23H 7/065; B23H 7/18; B23H 7/20; B23H 7/16; B23H 7/04; B23H 2500/20; G05B 2219/45043
See application file for complete search history.

(56) References Cited

U.S. PATENT DOCUMENTS

| | | | |
|---|---|---|---|
| 4,338,505 A | 7/1982 | Katsube et al. | |
| 4,361,745 A * | 11/1982 | Rupert ............... | B23H 7/18 |
| | | | 219/69.13 |

(Continued)

FOREIGN PATENT DOCUMENTS

| | | |
|---|---|---|
| JP | S56-27741 A | 3/1981 |
| JP | H01-210221 A | 8/1989 |

(Continued)

OTHER PUBLICATIONS

Machine translation of Japan Patent document No. 2005-205,531-A, Dec. 2017.*
Machine translation of Japan Patent document No. 04-289,026, Dec. 2017.*
Extended European Search Report in EP Application No. 15176488.3 dated Jan. 4, 2016.

(Continued)

*Primary Examiner* — Geoffrey S Evans
(74) *Attorney, Agent, or Firm* — Hauptman Ham, LLP

(57) ABSTRACT

Electric discharge machining is halted during machining program operation, and a position of the machining halt point is stored. A wire electrode is retreated from the machining halt point to an arbitrary position in which a short-circuit with a workpiece is removed (retreat position), by interrupt operation in which axis movement is performed manually. Then, a return is made from the retreat position to the machining halt point while electric discharge machining is performed, machining program operation is started from the machining halt point, and electric discharge machining is restarted.

4 Claims, 9 Drawing Sheets

(56) References Cited

U.S. PATENT DOCUMENTS

| | | | | |
|---|---|---|---|---|
| 4,733,040 A * | 3/1988 | Pelloni | ............... | B23H 7/26 |
| | | | | 219/69.16 |
| 5,113,051 A * | 5/1992 | Sakaue | ............ | B23H 7/101 |
| | | | | 219/69.12 |
| 5,324,908 A * | 6/1994 | Masuda | ............. | B23H 7/04 |
| | | | | 219/69.12 |
| 5,852,268 A * | 12/1998 | Buhler | ............... | B23H 7/04 |
| | | | | 219/69.12 |
| 6,028,281 A | 2/2000 | Yamada et al. | | |
| 6,303,890 B1 * | 10/2001 | Scuderi | ............... | B23H 7/18 |
| | | | | 219/69.16 |
| 2004/0030440 A1 * | 2/2004 | Murai | ............. | B23H 7/065 |
| | | | | 700/162 |

FOREIGN PATENT DOCUMENTS

| | | | |
|---|---|---|---|
| JP | 3-86428 A | | 4/1991 |
| JP | 04-289026 A | * | 10/1992 |
| JP | 06-277949 A | * | 10/1994 |
| JP | H06-277949 A | | 10/1994 |
| JP | 07-032218 A | * | 2/1995 |
| JP | 10-109226 A | | 4/1998 |
| JP | 2005-205531 A | * | 8/2005 |

OTHER PUBLICATIONS

Office Action dated Oct. 20, 2015, corresponding to Japanese Patent Application No. 2015-120062.

* cited by examiner

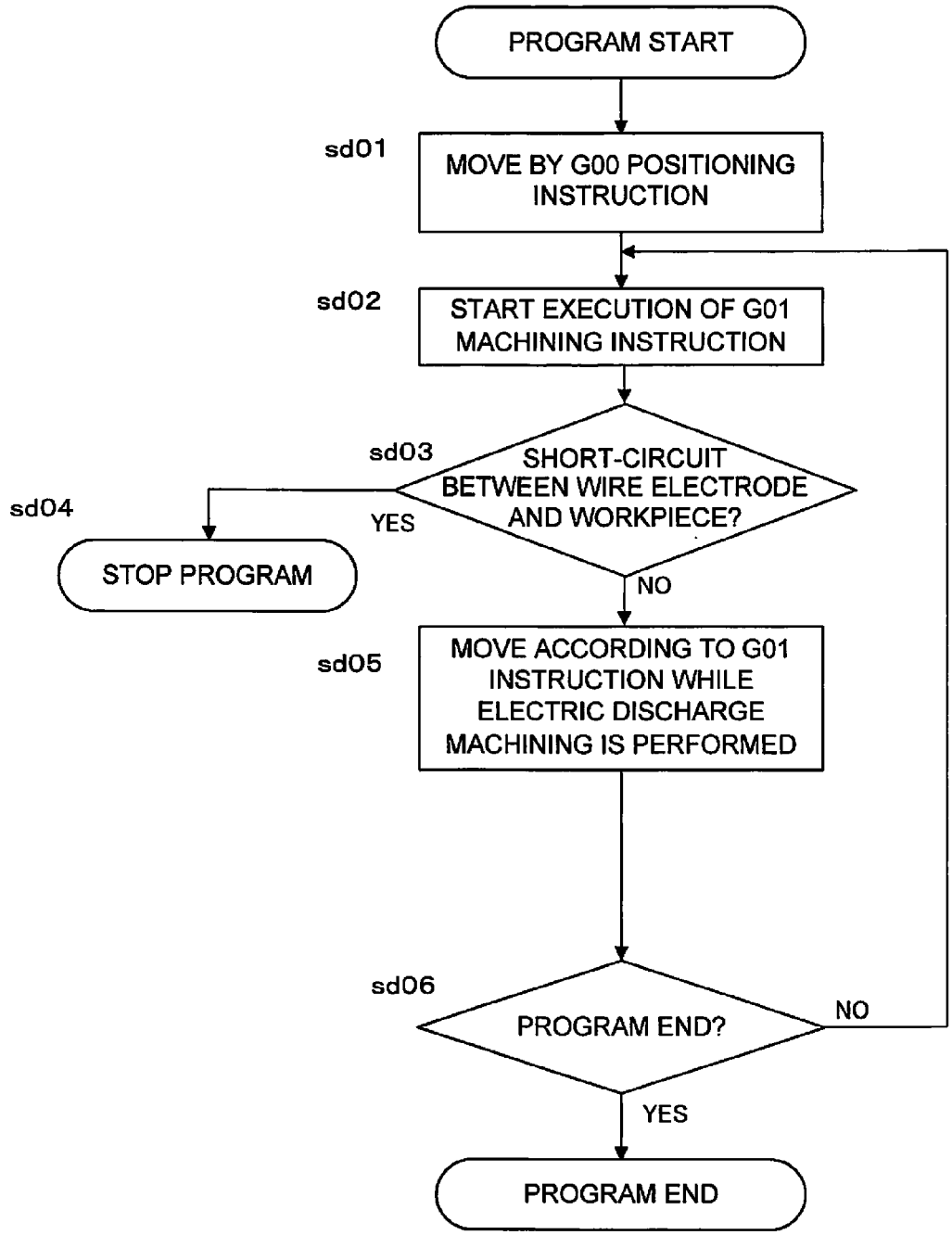

WIRE ELECTRIC DISCHARGE MACHINE HAVING FUNCTION OF MOVING FROM ARBITRARY RETREAT POSITION IN ELECTRIC DISCHARGE STATE AND RETURNING TO HALT POSITION

RELATED APPLICATIONS

The present application claims priority to Japanese Application Number 2014-163926, filed Aug. 11, 2014, the disclosure of which is hereby incorporated by reference herein in its entirety.

BACKGROUND OF THE INVENTION

1. Field of the Invention

The present invention relates to a wire electric discharge machine and more particularly to a wire electric discharge machine having a function of moving from an arbitrary retreat position in an electric discharge state and returning to a halt position.

2. Description of the Related Art

In prior art, a wire electric discharge machine has the following function: if a wire electrode and a workpiece are short-circuited during machining and electric discharge machining does not proceed, relative movement of the wire electrode and the workpiece is performed to make the wire electrode trace back a machining path and remove the short-circuit, and then the wire electrode is returned to an original machining position and the machining is restarted.

Japanese Patent Application Laid-Open No. 56-27741 discloses a technique in which, if electric discharge machining is halted due to a break in a wire electrode during program operation, the wire electrode is automatically returned to a prestored machining start point, wire connection operation is performed in a machining start hole, and returned from the machining start point to a machining halt point along a machined path by dry-run control, and machining is performed again at the machining halt point in an electric discharge state.

Japanese Patent Application Laid-Open No. 6-277949 discloses a technique in which, if a wire electrode and a workpiece are short-circuited during machining by a wire electric discharge machining device and electric discharge machining does not proceed, relative movement of the wire electrode and a table is performed to make the wire electrode trace back a machining path and remove the short-circuit (retraction control), and then electric discharging is started, the wire electrode is returned to an original machining position, and further electric discharge machining is continued from that area.

Japanese Patent Application Laid-Open No. 1-210221 discloses a technique in which, if a short-circuit occurs because of deviation of a machining start hole with respect to a machining start point, a wire electrode is manually retreated to a position in which the short-circuit can be removed and machining can be started, and the wire electrode is automatically returned to a true machining start point position from that area while electric discharge machining is performed.

FIG. 10 is a flowchart illustrating a flow of processing by wire electric discharge machining in prior art.

Movement is made by a G00 positioning instruction (step sd01). Execution of a G01 machining instruction is started (step sd02). Whether a short-circuit between a wire electrode and a workpiece has occurred or not is determined (step sd03). If a short-circuit has occurred (YES), a program is stopped (step sd04). If a short-circuit has not occurred (NO), movement is made along the G01 machining instruction while electric discharge machining is performed (step sd05). Whether the program has ended or not is determined (step sd06). If the program has not yet ended (NO), the flow returns to step sd02 and the processing is continued (execution of the next machining instruction block is started). If the program has ended (YES), the processing is ended.

In a wire electric discharge machine, when movement is made from the outside of a workpiece to a machining area by the rapid traverse positioning instruction (G00) based on a programmed machining path, the size of the workpiece may be larger than the size assumed when the machining path program is created, and a wire electrode may already cut into the workpiece in an area positioned by rapid traverse.

If the wire electrode cuts into the workpiece in a short-circuit state and the machining instruction (G01) for the next block is issued, electric discharging is not started because of the short-circuit, and the machining instruction (G01) of path information required for tracing back the path is not provided (the positioning instruction (G00) cannot be used to calculate midway movement in the path). Therefore, a short-circuit error occurs and the wire electric discharge machine is brought to a stop state. Particularly, as in polycrystalline diamond (PCD) tool machining, when a PCD tip is brazed to a tool body, a workpiece is often fixed in a position deviated from an assumed workpiece position due to a positioning error of brazing, and the above problem is likely to occur.

When an allowance for the size of a workpiece is made (that is, the size of the workpiece is assumed to be larger to a certain degree), and a machining program is created so that machining is performed significantly before an end face of the workpiece by a machining instruction (such as G01), the above problem does not occur. However, in PCD tool machining, to prevent deterioration of conductivity of a PCD material, it is desirable that a time period in which voltage that is not related to machining is applied is as short as possible. In addition, to reduce operation time, there may be a case in which a wire electrode should be moved to an end face of the workpiece as close as possible by the positioning instruction with a fast movement speed (G00), rather than by the machining instruction with a slow movement speed (G01).

Though a machining is instructed according to the machining instruction (G01) from a state in which a wire electrode is cut into a workpiece and a short-circuit state occurs by a rapid rapid traverse positioning instruction (G00), Such a start of electric discharging in a short-circuit state will causes DC electricity to inevitably flow at once between the wire electrode and the workpiece without resistance of machining fluid in a machining gap between the wire electrode and the workpiece interposed, thereby causing disconnection of the wire electrode. For this reason, to deal with such problem, a wire electric discharge machine is basically designed not to start in a short-circuit state.

To restart machining from this state, a wire electrode position must be temporarily moved to a program start position in the outside of the workpiece by axis movement, and a machining program must be edited, in which the program must be reedited so that the rapid traverse positioning instruction (G00) is used to specify movement to a position in which cutting into the workpiece does not occur, and the machining instruction (G01) is used to specify subsequent movement. Then, the program must be executed again from the beginning.

Each time such a state occurs, the machining program must be edited on a machine or must be reedited on a program device. However, some operators of the machine can perform an operation for starting the machine but may often lack an ability of program editing and have a difficulty in modifying the program. Particularly, if an operator with an ability of program editing is absent during work in the nighttime, the machining work may be started after the operator comes to the office the next day and edits the program, causing a problem of delayed delivery of a product. Therefore, a function is required by which the machining can be restarted from a short-circuit state only by a simple operation, without modifying the machining program.

In the technique disclosed in Japanese Patent Application Laid-Open No. 56-27741 above, a return is made from a machining start point to a halt point along a machining path, but a path movement instruction is only a machining instruction (G01, G02, or G03) and this function is provided for movement in this section by dry-run. Therefore, the function is not a function to be provided in the present invention in which a wire electrode returns while performing electric discharge machining from an arbitrary area other than a machining start point or a midway path to a halt point at which the wire electrode has cut into a workpiece, in a section between a machining start point and a non-machining point of the rapid traverse instruction (G00).

In the technique disclosed in Japanese Patent Application Laid-Open No. 6-277949 above, as in the technique disclosed in Japanese Patent Application Laid-Open No. 56-27741 above, tracing back a path already machined by the machining instruction (G01) is performed. However, a return from a point of the rapid traverse positioning instruction (G00) or an arbitrary area other than the path is not described.

In the technique disclosed in Japanese Patent Application Laid-Open No. 1-210221 above, before the start by program operation, an amount of manual movement from a machining start point to a position in which machining can be performed is stored, and only a return is made backward by the stored movement amount in automatic mode. In this technique, it is not possible to avoid the above problem, that is, a short-circuit state that may occur in a stage in which the machining instruction (G01) is issued after the rapid traverse instruction (G00) following the start of the program.

SUMMARY OF THE INVENTION

An object of the present invention is to provide a wire electric discharge machine that overcomes the weaknesses and problems in the prior art techniques described above and can restart machining by a simple method.

According to a wire electric discharge machine according to the present invention, a wire electrode can be retreated from a machining halt point in which machining stops during program operation to a position in which a short-circuit is to be removed, by interrupt operation in which axis movement is performed manually, without editing the program, the wire electrode can be returned from that position to the machining halt point while electric discharge machining is performed, and then the machining program can be restarted from the halt point by program operation.

In the present invention, a wire electrode can be retreated from a machining halt point in which machining stops during program operation to an arbitrary position in which a short-circuit is removed, by interrupt operation in which axis movement is performed manually, without editing the program. The wire electrode can then be returned from that position to the machining halt point taking the shortest way by simply pressing an electric discharge-on button and a return-to-halt-point button regardless of a programmed machining path while performing electric discharge machining. Then, the machining program is restarted from the halt point by program operation.

In addition, depending on a path of a rapid traverse positioning instruction, after a halt due to a short-circuit, the positioning instruction is automatically read as a machining instruction, and tracing back the path of the read positioning instruction is made for returning to a position in which the short-circuit is to be removed. After the short-circuit is removed, electric discharging is automatically turned on, returning to the machining halt point is made again while performing electric discharge machining, and machining is restarted from that machining halt point.

(1) A wire electric discharge machine according to the present invention has a function of restarting machining at a machining halt point. A first embodiment of the wire electric discharge machine includes a storage unit that stores a halt position when program operation is halted after the start of machining by the program operation, an axis movement retreat unit that retreats a wire electrode from the halt position to an arbitrary retreat position by a manual interrupt, a return unit that returns the wire electrode in an electric discharge state from the arbitrary retreat position to the halt position, and a machining restart unit that restarts machining after the return of the wire electrode by the return unit.

The return unit may be configured to control a feedrate under the same machining conditions as those for automatic machining by a program when the return unit returns the wire electrode in an electric discharge state from the arbitrary retreat position to the halt position.

A second embodiment of the wire electric discharge machine according to the present invention includes a return unit. The return unit is configured to make tracing back a programmed path of the movement block (G00) of a rapid traverse positioning instruction to a position in which a short-circuit is removed if a wire electrode and a workpiece are in a short-circuit state in a position in which the rapid traverse positioning instruction block is switched to a machining instruction block after the start of machining by program operation. The return unit is also configured to start electric discharging and makes a return to a halt position while machining is performed by reading the rapid traverse positioning instruction block as the machining instruction block after the short-circuit is removed.

A third embodiment of the wire electric discharge machine according to the present invention includes a return unit. The return unit is configured to make tracing back to a programmed start point of a movement block (G00) of a rapid traverse positioning instruction if a wire electrode and a workpiece are in a short-circuit state in a position in which the rapid traverse positioning instruction block is switched to a machining instruction block after the start of machining by program operation. The return unit is also configured to start electric discharging and make a return to a halt position while electric discharge machining is performed by reading the rapid traverse positioning instruction block as the machining instruction block.

The present invention may provide a wire electric discharge machine that can restart machining only by a simple manual intervention or automatically without modifying a machining program even if machining cannot be continued, and that is very useful in improving productivity.

BRIEF DESCRIPTION OF THE DRAWINGS

The above and other objects and features of the present invention will be apparent from the following description of embodiments with reference to the appended drawings, in which:

FIG. 10 is a flowchart illustrating a flow of return processing by a wire electric discharge machine according to a prior art technique.

DETAILED DESCRIPTION OF THE PREFERRED EMBODIMENTS

Figure 1:
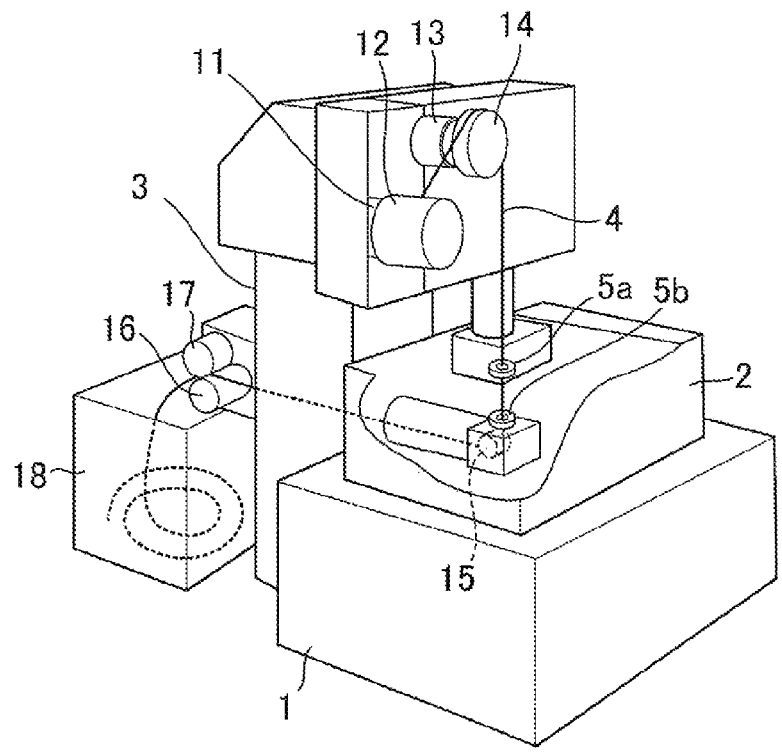
FIG. 1 is a schematic configuration diagram of an embodiment of a wire electric discharge machine according to the present invention.

An embodiment of a wire electric discharge machine according to the present invention will be described with reference to FIG. 1.

In a wire electric discharge machine 30, a wire bobbin 12 around which a wire electrode 4 is wound is attached to the top of a column 3. Predetermined low torque is given to the wire bobbin 12 by a feed unit torque motor 11 in a direction opposite to a direction in which the wire electrode 4 is pulled. The wire electrode 4 unreeled from the wire bobbin 12 passes through a brake shoe 14 driven by a brake motor 13, an upper guide 5a, a lower guide 5b, and a lower guide roller 15, and is wound around a feed roller 16. A tension between the brake shoe 14 driven by the brake motor 13 and the feed roller 16 driven by a wire electrode feed motor (not shown) is adjusted. The wire electrode 4 is put between a pinch roller 17 and the feed roller 16 driven by the wire electrode feed motor (not shown) and collected to a wire electrode collection box 18. A table on which a workpiece is to be placed is attached to the inside of a work tank 2 on a machine base 1. A workpiece (not shown) to be subjected to electric discharge machining is placed on the table (not shown) in an electric discharge machining region between the upper guide 5a and the lower guide 5b, high-frequency voltage is applied from a machining power supply to the wire electrode 4, and electric discharge machining is performed.

Figure 2:
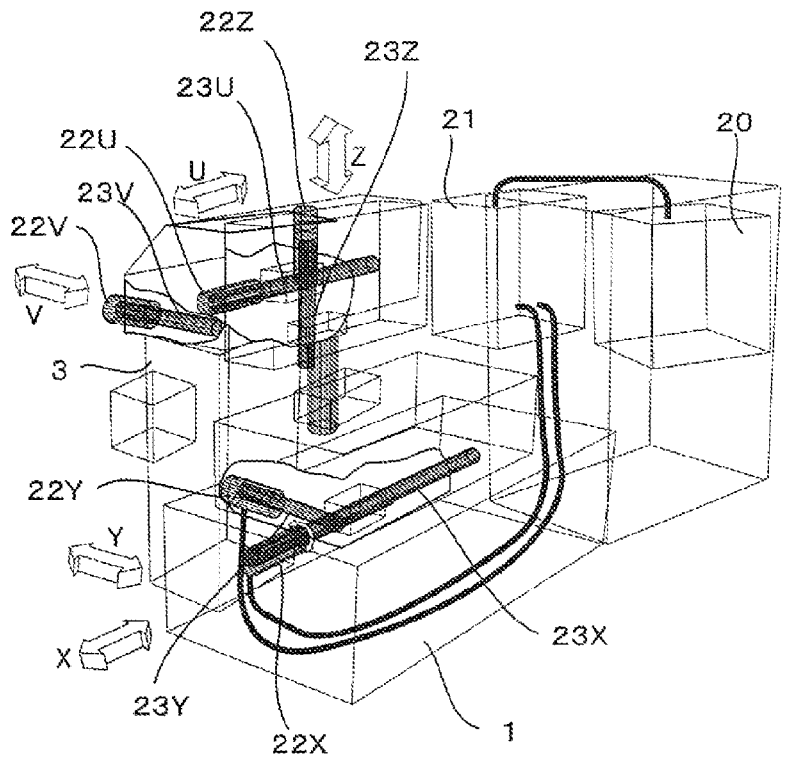
FIG. 2 illustrates an axis movement configuration of the wire electric discharge machine in FIG. 1.

FIG. 2 illustrates an axis movement configuration of the wire electric discharge machine 30 in FIG. 1.

The entire wire electric discharge machine 30 is controlled by a numerical controller 20. The numerical controller 20 controls drives of motors 22X, 22Y, 22Z, 22U, and 22V for X, Y, Z, U, and V axes via a servo amplifier 21.

To the machine base 1, the motors 22X and 22Y are attached that drive, in an X axis direction and a Y axis direction, the table (not shown) on which a workpiece is to be placed. Ball screws 23X and 23Y are coupled to the motors 22X and 22Y. Driving force of the motors 22X and 22Y is transferred to the ball screws 23X and 23Y, and thereby the table is moved in the X axis direction and the Y axis direction.

The motors 22Z, 22U, and 22V are attached to the top of the column 3. Ball screws 23Z, 23U, and 23V are coupled to the motors 22Z, 22U, and 22V. Driving force of the motors 22Z, 22U, and 22V is transferred to the ball screws 23Z, 23U, and 23V, and thereby the upper guide 5a can be moved in a Z axis direction, a U axis direction, and a V axis direction.

A first example of a machining restart function of the electric discharge machine according to the present invention in which a return to a machining halt position is made in an electric discharge state by movement from a retreat position will first be described with FIGS. 3A and 3B.

Figure 3A:
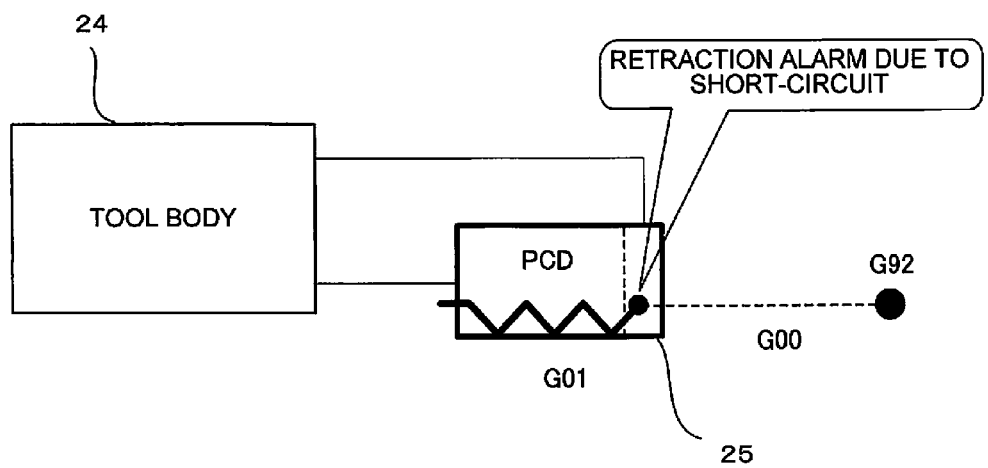
FIGS. 3A and 3B illustrate a first example of a machining restart function of the electric discharge machine according to the present invention in which a return to a machining halt position is made in an electric discharge state by movement from a retreat position.

FIG. 3A illustrate a problem that may occur in a prior art technique with a program in which, to perform electric discharge machining of a PCD tip 25 fixed to a tool body 24, an advance is made from an outer region of a workpiece by the rapid traverse positioning instruction G00 and machining is performed by the machining instruction G01. If the workpiece is fixed in a position short of an assumed position and a wire electrode advances to the workpiece by the rapid traverse positioning instruction G00, the wire electrode may come into contact with the workpiece, causing a short-circuit. In this case, there is a difficulty in removing the short-circuit between the wire electrode and the workpiece and restarting machining.

Figure 3B:
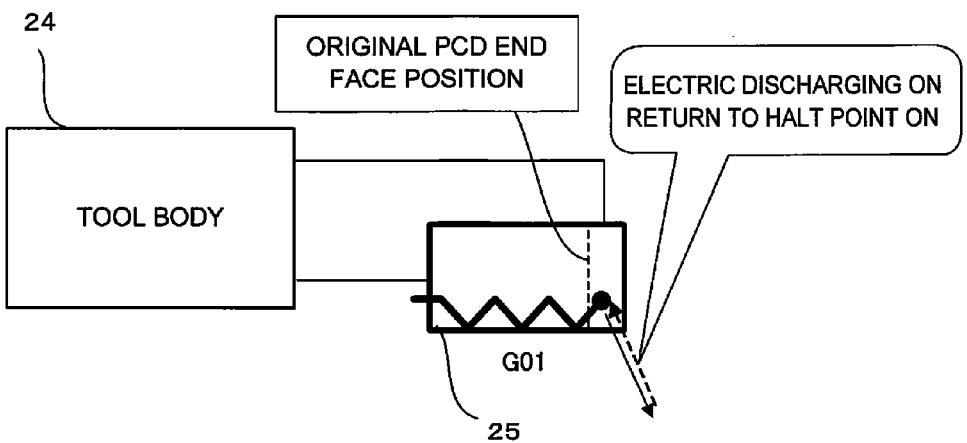

FIG. 3B illustrates means for solving the aforementioned problem by the present invention, in which, after movement (retreat) by jog feed, a return to a halt point is made by speed control in proportion to average machining voltage set in machining conditions (hereinafter referred to as electric discharge servo control) while electric discharging is turned on. Because machining cannot be performed from the halt point at which a retraction alarm has occurred, the wire electrode is temporarily moved to the outside of the workpiece (retreated to a retreat position) in manual mode, a short-circuit is removed, and then the wire electrode is returned again to the halt point (from the retreat position) by electric discharge servo control based on the set machining conditions while electric discharging is turned on. Thus, machining can be easily restarted.

A modification of the first example of the machining restart function of the electric discharge machine according to the present invention in which a return to a machining halt position is made in an electric discharge state by movement from a retreat position will next be described with FIGS. 4A and 4B.

Figure 4A:
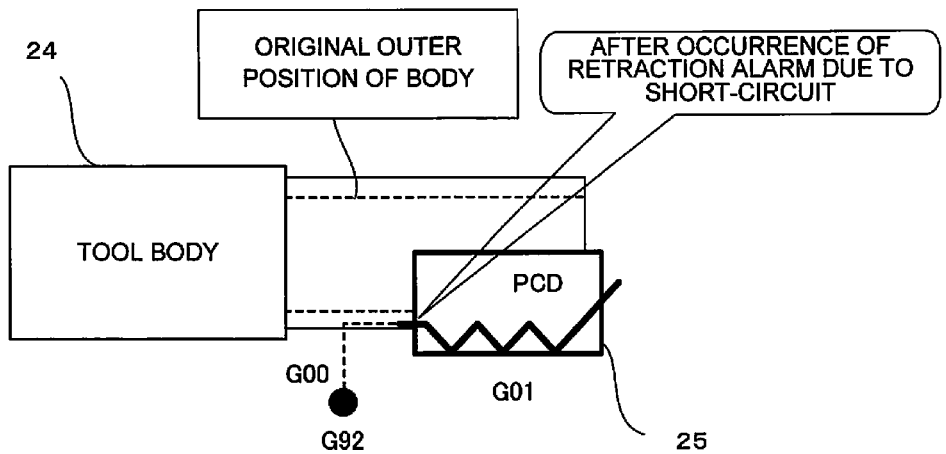
FIGS. 4A and 4B illustrate a modification of the first example of the machining restart function of the electric discharge machine according to the present invention in which a return to a machining halt position is made in an electric discharge state by movement from a retreat position.

FIG. 4A illustrate a problem in a prior art technique which will occur in a case where a tool body is larger than expected and a short-circuit with a wire electrode arises during the positioning instruction (G00) immediately after the start of the positioning instruction. In the machining instruction (G01) in the next block, electric discharge machining cannot be performed due to the short-circuit and the wire electrode stops. There is a constraint that the short-circuit removal function (retraction control) that is started by short-circuit during machining is applied only to a machining instruction block such as G01, G02, or G03 and is not applied to the G00 positioning instruction.

Figure 4B:
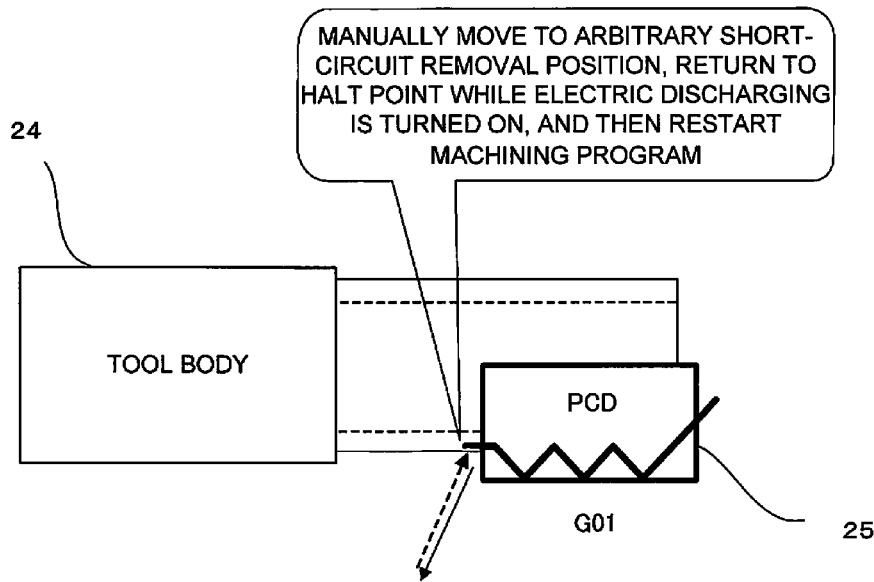

FIG. 4B illustrates means for solving the aforementioned problem by the present invention, in which, after movement (retreat) by jog feed, a return to a halt point is made by servo feed set in machining conditions while electric discharging is turned on. Because machining cannot be performed from the halt point at which a retraction alarm has occurred, the wire electrode is temporarily moved to the outside of the workpiece (retreated to a retreat position) in manual mode, a short-circuit is removed, and then the wire electrode is returned again to the halt point (from the retreat position) by electric discharge servo control based on the set machining conditions while electric discharging is turned on. Thus, machining can be easily restarted.

Figure 5:
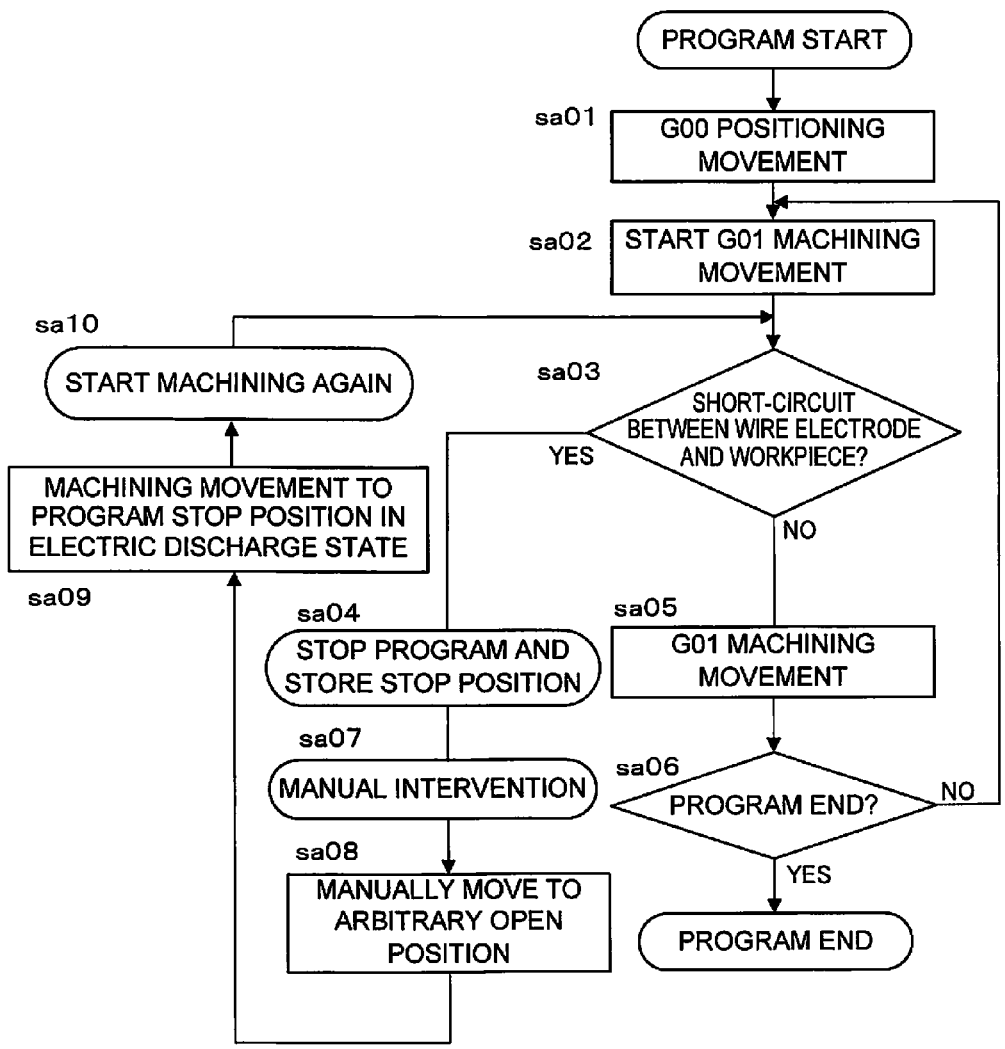
FIG. 5 is a flowchart illustrating the first example of the machining restart function of the electric discharge machine according to the present invention.

The first example (and the modification of the first example) of the machining restart function of the electric discharge machine according to the present invention will be described with reference to a flowchart in FIG. 5.

At the beginning of a program, a wire electrode and a workpiece are moved relatively by the rapid traverse positioning instruction (G00) (step sa01). Machining is started by the machining instruction (G01) (step sa02). Whether a short-circuit between the wire electrode and the workpiece has occurred or not is determined (step sa03). If a short-circuit has occurred (YES), the flow shifts to step sa04. If a short-circuit has not occurred (NO), the flow shifts to step sa05.

In step sa05, machining is performed by the machining instruction (G01). Whether the program has ended or not is determined (step sa06). If the program has not yet ended, the flow returns to step sa02 and the processing is continued.

In step sa04, a program stop position is stored and the program is stopped. Then, an operator intervenes manually (step sa07). The wire electrode or the workpiece is manually moved to an arbitrary retreat position in which the short-circuit between the wire electrode and the workpiece is removed (step sa08). Then, movement from the retreat position to the program stop position is made while machining is performed in an electric discharge state (step sa09). Machining is performed again from the program stop position (step sa10).

A second example of the machining restart function of the electric discharge machine according to the present invention in which a return to a machining halt position is made in an electric discharge state by movement from a retreat position will next be described with FIGS. 6A and 6B.

Figure 6A:
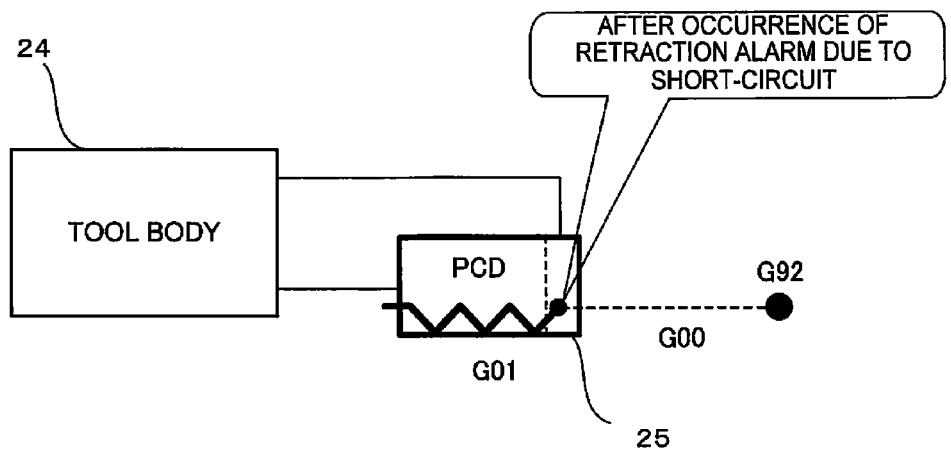
FIGS. 6A and 6B illustrate a second example of the machining restart function of the electric discharge machine according to the present invention in which a return to a machining halt position is made in an electric discharge state by movement from a retreat position.

FIG. 6A illustrates a problem with a program in which an advance is made from an outer region of a workpiece by the rapid traverse positioning instruction G00 and machining is performed by the machining instruction G01. If the workpiece is fixed in a position before an assumed position and a wire electrode advances to the workpiece by the rapid traverse positioning instruction G00, the wire electrode may come into contact with the workpiece, causing a short-circuit. In this case, there is a difficulty in removing the short-circuit between the wire electrode and the workpiece and restarting machining.

Figure 6B:
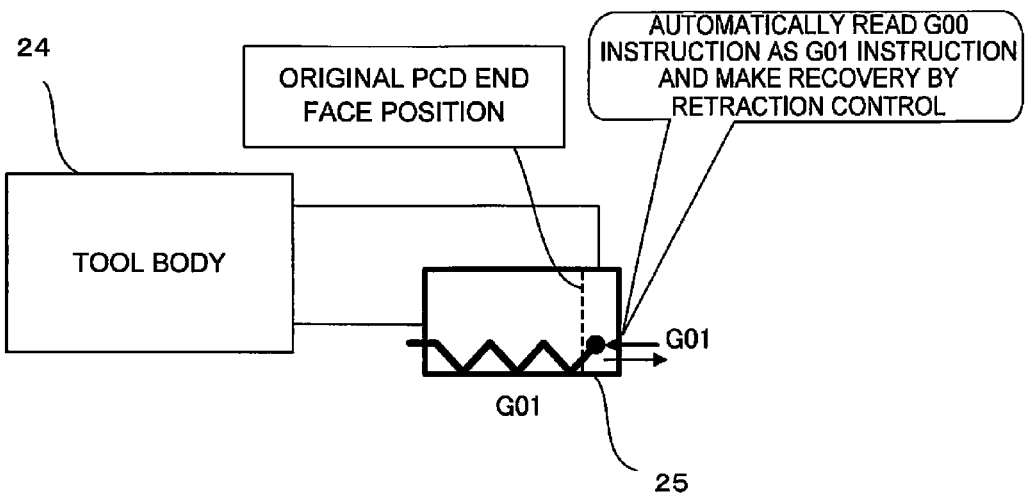

FIG. 6B illustrates means for solving the aforementioned problem by the present invention, in which the G00 positioning instruction is read as the G01 machining instruction, retraction control is performed, and automatic recovery is made. After a short-circuit between a wire electrode and a workpiece has occurred and the wire electrode is stopped, the rapid traverse positioning instruction (G00) is read as the machining instruction (G01), retraction control is performed, and the wire electrode is made to trace back a path to a position in which the short-circuit is removed (to a retreat position). Then, after the short-circuit is removed, an automatic return to the machining halt point is made (from the retreat position) while electric discharging is turned on and machining is performed, and then machining is restarted.

Figure 7:
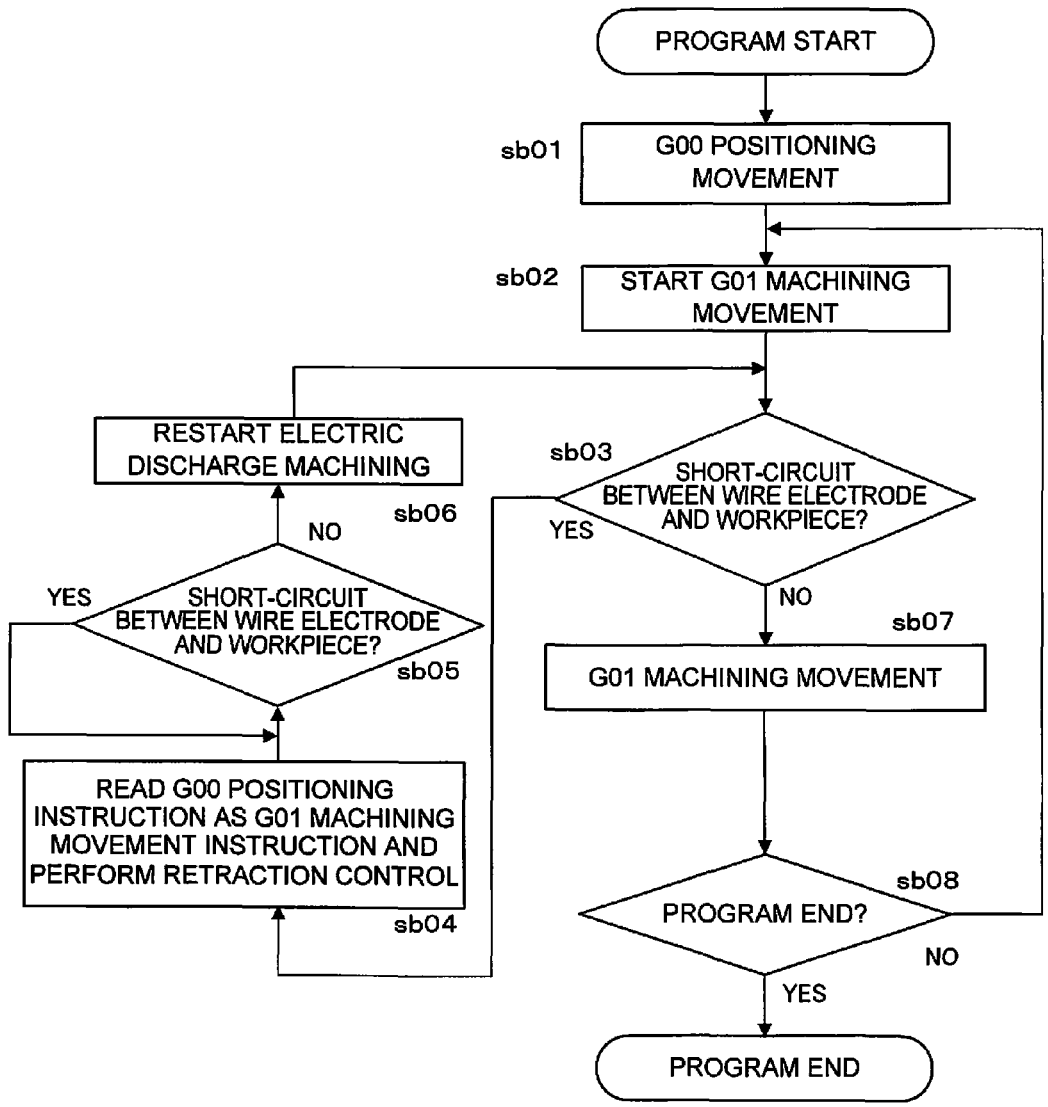
FIG. 7 is a flowchart illustrating the second example of the machining restart function of the electric discharge machine according to the present invention.

The second example of the machining restart function of the electric discharge machine according to the present invention will be described with reference to a flowchart in FIG. 7.

At the beginning of a program, a wire electrode and a workpiece are moved relatively by the rapid traverse positioning instruction (G00) (step sb01). Machining is started by the machining instruction (G01) (step sb02). Whether a short-circuit between the wire electrode and the workpiece has occurred or not is determined (step sb03). If a short-circuit has occurred (YES), the flow shifts to step sb04. If a short-circuit has not occurred (NO), the flow shifts to step sb07.

In step sb04, the G00 positioning instruction is read as the G01 machining movement instruction, and retraction control is performed. Whether a short-circuit between the wire electrode and the workpiece has occurred or not is detected (step sb05). Movement by G01 is made until the short circuit is removed. When the short-circuit state is removed, electric discharge machining is restarted (step sb06). Then, the flow returns to step sb03.

In step sb07, machining is performed by the machining instruction (G01). Whether the program has ended or not is determined (step sb08). If the program has not yet ended, the flow returns to step sb02 and the processing is continued.

A third example of the machining restart function of the electric discharge machine according to the present invention in which a return to a machining halt position is made in an electric discharge state by movement from a retreat position will next be described with FIGS. 8A and 8B.

Figure 8A:
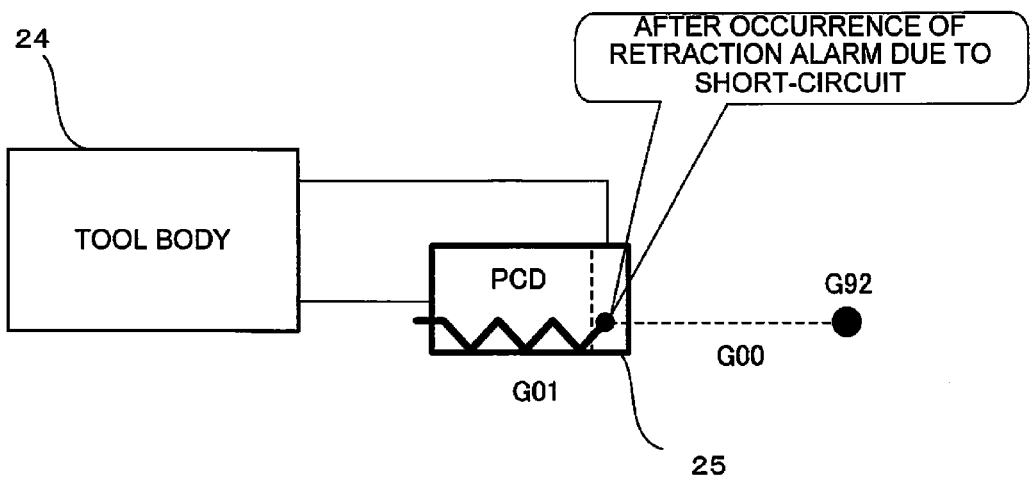
FIGS. 8A and 8B illustrate a third example of the machining restart function of the electric discharge machine according to the present invention in which a return to a machining halt position is made in an electric discharge state by movement from a retreat position.

FIG. 8A illustrates a problem with a program in which an advance is made from an outer region of a workpiece by the rapid traverse positioning instruction G00 and machining is performed by the machining instruction G01. If the workpiece is fixed in a position before an assumed position and a wire electrode advances to the workpiece by the rapid traverse positioning instruction G00, the wire electrode may come into contact with the workpiece, causing a short-circuit. In this case, there is a difficulty in removing the short-circuit between the wire electrode and the workpiece and restarting machining.

Figure 8B:
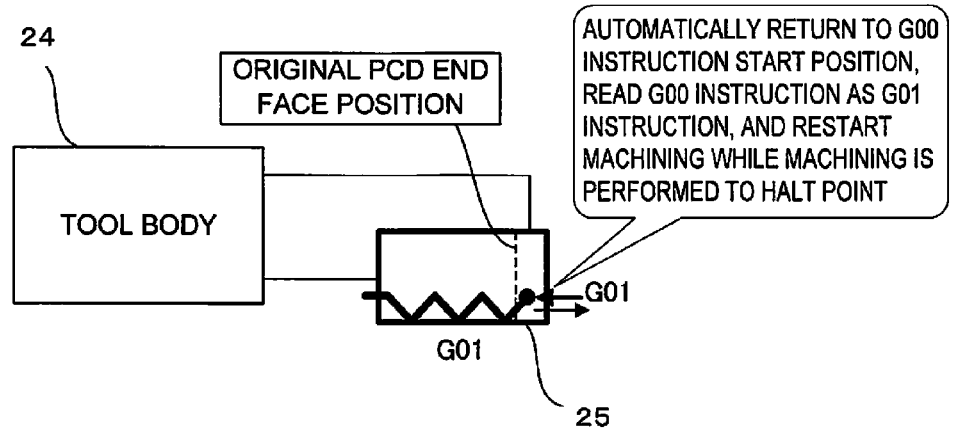

FIG. 8B illustrates means for solving the aforementioned problem by the present invention, in which the G00 positioning instruction is read as the G01 machining instruction, a return to a start point of the G00 positioning instruction is made, and automatic recovery is made. After a short-circuit between a wire electrode and a workpiece has occurred and the wire electrode is stopped, positioning movement for a return to the start position of the rapid traverse positioning instruction (G00) is made by rapid traverse, the rapid traverse positioning instruction (G00) is read as the machining instruction (G01), an automatic return to the machining halt point is made while machining is performed again, and then machining is continued.

Figure 9:
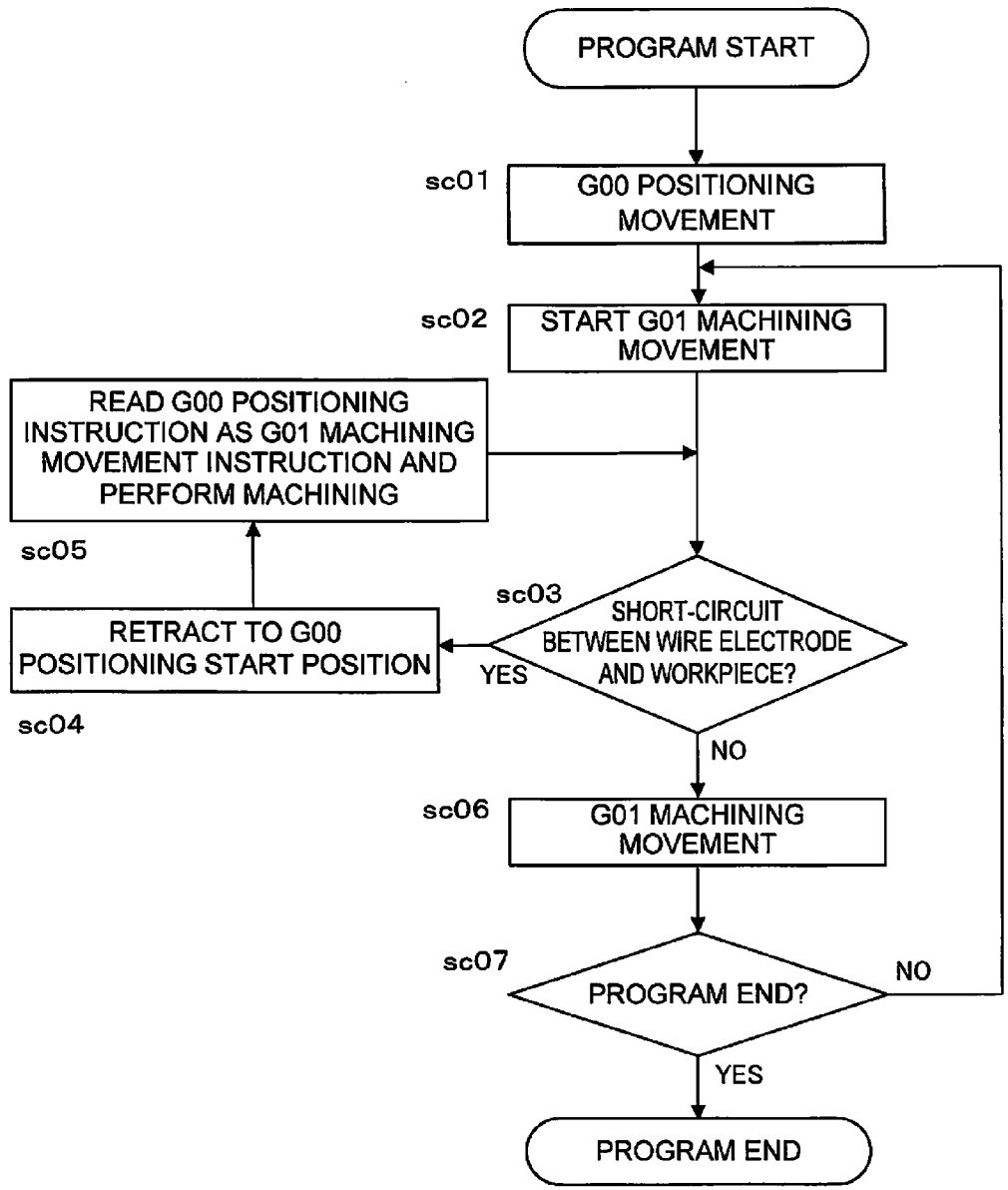
FIG. 9 is a flowchart illustrating the third example of the machining restart function of the electric discharge machine according to the present invention.

The third example of the machining restart function of the electric discharge machine according to the present invention will be described with reference to a flowchart in FIG. 9.

At the beginning of a program, a wire electrode and a workpiece are moved relatively by the rapid traverse positioning instruction (G00) (step sc01). Machining is started by the machining instruction (G01) (step sc02). Whether a short-circuit between the wire electrode and the workpiece has occurred or not is determined (step sc03). If a short-circuit has occurred (YES), the flow shifts to step sc04. If a short-circuit has not occurred (NO), the flow shifts to step sc06.

In step sc04, the wire electrode is automatically moved to the start position of the G00 positioning (step sc04). The G00 positioning instruction is read as the G01 machining movement instruction and machining is performed (step sc05). Then, the flow returns to step sc03.

In step sc06, machining movement is performed by the machining movement instruction (G01). Whether the program has ended or not is determined (step sc07). If the program has not yet ended, the flow returns to step sc02 and the processing is continued.

The invention claimed is:

1. A wire electric discharge machine having a function of restarting machining at a machining halt point, said wire electric discharge machine comprising:
   a table configured to support a workpiece;
   a wire electrode configured to machine the workpiece; and
   a numerical controller configured to
      start machining by a program operation; and
      store a halt position when the program operation is halted after the start of machining by the program operation;
   wherein when the wire electrode is retreated from the halt position to a retreat position away from the workpiece by a manual interrupt, the numerical controller is configured to
      cause the wire electrode in an electric discharge state to return from the retreat position to the halt position; and
      restart machining after the wire electrode is returned to the halt position.

2. The wire electric discharge machine according to claim 1, wherein the numerical controller is configured to control a feedrate under the same machining conditions as machining conditions for automatic machining by a program when the wire electrode in an electric discharge state is caused by the numerical controller to return from the retreat position to the halt position.

3. A wire electric discharge machine having a function of restarting machining at a machining halt point, said wire electric discharge machine comprising:
   a table configured to support a workpiece;
   a wire electrode configured to machine the workpiece; and
   a numerical controller configured to
      start machining by a program operation;
      trace back a programmed path of a movement block of a rapid traverse positioning instruction to a position in which a short-circuit is removed if the wire electrode and the workpiece are in a short-circuit state in a position in which the rapid traverse positioning instruction block is switched to a machining instruction block after the start of machining by the program operation, and
      start electric discharging and cause the wire electrode to return to a halt position while electric discharge machining is performed by reading the rapid traverse positioning instruction block as the machining instruction block after the short-circuit is removed.

4. A wire electric discharge machine having a function of restarting machining at a machining halt point, said wire electric discharge machine comprising:
   a table configured to support a workpiece;
   a wire electrode configured to machine the workpiece; and
   a numerical controller configured to
      start machining the workpiece by a program operation;
      make positioning for a return to a programmed start point of a movement block of a rapid traverse positioning instruction if the wire electrode and the workpiece are in a short-circuit state in a position in which the rapid traverse positioning instruction block is switched to a machining instruction block after the start of machining by the program operation, and
      cause the wire electrode to return to a halt position while electric discharge machining is performed by reading the rapid traverse positioning instruction block as the machining instruction block.

* * * * *